(12) United States Patent
Futamura et al.

(10) Patent No.: US 8,279,378 B2
(45) Date of Patent: Oct. 2, 2012

(54) PRODUCING METHOD FOR LENGTHWISE OPTICAL LAMINATE AND LIQUID CRYSTAL PANEL

(75) Inventors: Kazunori Futamura, Ibaraki (JP); Junichi Nagase, Ibaraki (JP); Hiroyuki Yoshimi, Ibaraki (JP); Masaki Hayashi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 472 days.

(21) Appl. No.: 12/523,213

(22) PCT Filed: Jan. 16, 2008

(86) PCT No.: PCT/JP2008/050406
§ 371 (c)(1),
(2), (4) Date: Aug. 11, 2009

(87) PCT Pub. No.: WO2008/096577
PCT Pub. Date: Aug. 14, 2008

(65) Prior Publication Data
US 2010/0073608 A1 Mar. 25, 2010

(30) Foreign Application Priority Data
Feb. 8, 2007 (JP) .................. 2007-029011

(51) Int. Cl.
*G02F 1/1335* (2006.01)
(52) U.S. Cl. ........... 349/96; 349/117; 349/118; 349/119
(58) Field of Classification Search .................. 349/96, 349/117, 118, 119
See application file for complete search history.

(56) References Cited

U.S. PATENT DOCUMENTS
6,831,713 B2 * 12/2004 Sugino et al. .................. 349/96
(Continued)

FOREIGN PATENT DOCUMENTS
JP 2001-305347 A 10/2001
(Continued)

OTHER PUBLICATIONS
International Search Report of PCT/JP2008/050406, Mailing Date of Apr. 15, 2008.
(Continued)

*Primary Examiner* — Mike Qi
(74) *Attorney, Agent, or Firm* — Westerman, Hattori, Daniels & Adrian, LLP

(57) ABSTRACT

The object of the present invention is to provide a producing method for a lengthwise optical laminate exhibiting high contrast ratio and adaptable to a large-sized display. The present invention provides a producing method for a lengthwise optical laminate, which comprises a step 1 of coating and drying a coating solution comprising a birefringent material and a solvent on a surface of a lengthwise base material to form a birefringent film such that a birefringence index (Anxz [590]) in the thickness direction at a wavelength of 590 nm is 0.02 or more, and produce a lengthwise sheet (A) comprising the base material and the birefringent film; a step 2 of drawing a lengthwise film of a hydrophilic polymer containing a dichroic material so that a draw ratio is from 3 times to 5 times based on the original length and a neck-in ratio is 55% or less to produce a lengthwise polarizer (B); and a step 3 of laminating the lengthwise sheet (A) obtained in the step 1 on one plane of the lengthwise polarizer (B) obtained in the step 2 to produce the lengthwise optical laminate.

10 Claims, 5 Drawing Sheets

U.S. PATENT DOCUMENTS

| | | | |
|---|---|---|---|
| 7,126,754 B2 * | 10/2006 | Yamaoka et al. | 359/485.03 |
| 7,223,452 B2 * | 5/2007 | Murakami et al. | 428/1.3 |
| 7,428,029 B2 * | 9/2008 | Murakami et al. | 349/117 |
| 7,494,689 B2 * | 2/2009 | Hayashi et al. | 427/162 |
| 7,867,414 B2 * | 1/2011 | Ishibashi et al. | 264/2.7 |
| 2010/0245727 A1 * | 9/2010 | Shigetomi et al. | 349/96 |

FOREIGN PATENT DOCUMENTS

| | | | |
|---|---|---|---|
| JP | 2003-344657 A | | 12/2003 |
| JP | 2004-004474 A | | 1/2004 |
| JP | 2004-195875 A | | 7/2004 |
| JP | 2004195875 A | * | 7/2004 |
| JP | 2004-233871 A | | 8/2004 |
| JP | 2004-341515 A | | 12/2004 |
| JP | 2006-58437 A | | 3/2006 |
| JP | 2006-243558 A | | 9/2006 |
| JP | 2006-251224 A | | 9/2006 |
| JP | 2006243558 A | * | 9/2006 |
| KR | 2004-0069948 A | | 8/2004 |

OTHER PUBLICATIONS

Chinese Office Action dated Jan. 31, 2011, issued in corresponding Chinese Patent Application No. 200880004283.X.

Korean Office Action dated Dec. 20, 2010, issued in corresponding Korean Patent Application No. 10-2009-7012030. (With Partial English Translation).

Taiwanese Office Action dated Dec. 28, 2010, issued in corresponding Taiwanese Patent Application No. 97102318. (With Partial English Translation).

Japanese Office Action dated Jun. 29, 2012, issued in corresponding Japanese Patent Application No. 2007-335779, 6 pages. (w/partial English Translation).

* cited by examiner

PRODUCING METHOD FOR LENGTHWISE OPTICAL LAMINATE AND LIQUID CRYSTAL PANEL

TECHNICAL FIELD

The present invention relates to a producing method for lengthwise optical laminate used for a liquid crystal display and the like, and a liquid crystal panel comprising the optical laminate.

BACKGROUND ART

A liquid crystal display is utilized for various uses such as portable telephones, monitors, televisions, and the like while making use of characteristics thereof such as light weight, thin type, low power consumption, and the like. In recent years, for example, with regard to a liquid crystal display used for televisions, upsizing of the screen has rapidly progressed. For example, a liquid crystal television having a diagonal screen of 65 inches has been put to practical use. Under such a market trend, upsizing of an optical film utilized for the liquid crystal display has been urgent business.

A polarizer is known as one of the optical film utilized for the liquid crystal display. This polarizer is typically produced in such a manner that a rolled polyvinyl alcohol film is dyed with a dichroic material and is uniaxially drawn in a longitudinal direction. With regard to such a polarizer, it is generally conceived that the film with higher draw ratio is more excellent in optical property. Such a polarizer is disclosed in Patent Document 1.

However, when draw ratio is increased for obtaining a polarizer with high polarizing performance, effective width of the polarizer is narrowed by necking. Thus, it is difficult to obtain a polarizer appropriate for the above large-sized display.

Also, the liquid crystal display is low in contrast ratio in oblique directions. An optical film, in which a polarizer and a birefringent film are laminated, is used for improving this.

However, a liquid crystal display capable of further increasing contrast ratio thereof and displaying characters or screen images photographically in the oblique direction is demanded in the market.

Patent Document 1: JP-A-2004-341515

DISCLOSURE OF THE INVENTION

The object of the present invention is to provide a producing method for a lengthwise optical laminate exhibiting high contrast ratio and adaptable to a large-sized display, and a liquid crystal panel.

The present invention provides a producing method for a lengthwise optical laminate, which comprises a step 1 of coating and drying a coating solution comprising a birefringent material and a solvent on a surface of a lengthwise base material to form a birefringent film such that a birefringence index ($\Delta n_{xz}[590]$) in the thickness direction at a wavelength of 590 nm is 0.02 or more, and produce a lengthwise sheet (A) comprising the base material and the birefringent film; a step 2 of drawing a lengthwise film of a hydrophilic polymer containing a dichroic material so that a draw ratio is from 3 times to 5 times based on the original length and a neck-in ratio is 55% or less to produce a lengthwise polarizer (B); and a step 3 of laminating the lengthwise sheet (A) obtained in the step 1 on one plane of the lengthwise polarizer (B) obtained in the step 2 to produce the lengthwise optical laminate.

With regard to the above producing method, the lengthwise film is drawn at comparatively low draw ratio as compared with a conventional producing method for a polarizer. Thus, contraction of the film in the width direction is decreased and a wider lengthwise polarizer may be obtained as compared with the conventional method. Therefore, the producing method for a lengthwise optical laminate of the present invention allows an optical laminate to be produced corresponding to a liquid crystal display with a screen size of 70 inches or more, for example.

Further, the lengthwise polarizer obtained by the above producing method may effectively prevent light leakage in the oblique direction. Accordingly, a display screen with high contrast ratio in the oblique direction can be realized by applying an optical laminate comprising the polarizer to a liquid crystal display or the like.

As the lengthwise optical laminate obtained by the producing method of the present invention, a width of the lengthwise optical laminate is formed into 1500 mm or more.

Further, as the preferable producing method of the present invention, in the step 3, a base material side of the lengthwise sheet (A) is laminated so as to be adjacent to the lengthwise polarizer (B).

Also, as the preferable producing method of the present invention, in the step 3, a birefringent film side of the lengthwise sheet (A) is laminated so as to be adjacent to the lengthwise polarizer (B).

Further, the preferable producing method of the present invention comprises the following step 4 after the step 1. The step 4 is a step of drawing the lengthwise sheet (A) obtained in the step 1 in the width direction so that an index ellipsoid of the birefringent film satisfies nx>ny≧nz.

Also, as the preferable producing method of the present invention, a dichroic ratio (DR) of the lengthwise polarizer (B) is from 40 to 100.

Further, as the preferable producing method of the present invention, the lengthwise polarizer (B) has a polarization degree (P) of 99% or more and a transmittance (T) of 35% to 42%.

Also, as the preferable embodiment of the present invention, in the step 3, the lengthwise sheet (A) is laminated on one side of the lengthwise polarizer (B) through an adhesive layer.

Further, the preferable producing method of the present invention comprises the following step 5 after the step 3. The step 5 is a step of cutting out the lengthwise optical laminate obtained in the step 3 into a rectangular shape of 70 inches or more to produce a rectangular optical laminate.

The other means of the present invention provides a liquid crystal panel comprising the optical laminate obtained by any one of the producing methods described in the above.

The use of the optical laminate obtained by the producing method of the present invention allows a liquid crystal display with high contrast ratio in the oblique direction to be constituted as compared with a conventional polarizing plate with a retardation film.

BEST MODE FOR CARRYING OUT THE INVENTION

[A. Summary of Producing Method of the Present Invention]

A producing method for a lengthwise optical laminate of the present invention comprises at least a step 1 of coating and drying a coating solution comprising a birefringent material and a solvent on a surface of a lengthwise base material to form a birefringent film such that a birefringence index ($\Delta n_{nz}$ [590]) in the thickness direction at a wavelength of 590 nm is 0.02 or more, and produce a lengthwise sheet (A) comprising the base material and the birefringent film; a step 2 of drawing a lengthwise film of a hydrophilic polymer containing a dichroic material so that a draw ratio is from 3 times to 5 times based on the original length and a neck-in ratio is 55% or less to produce a lengthwise polarizer (B); and a step 3 of laminating the lengthwise sheet (A) obtained in the step 1 on one plane of the lengthwise polarizer (B) obtained in the step 2 to produce the lengthwise optical laminate.

Here, in the present specification, a sheet signifies the inclusion of those generally called a film.

The order of performing the step 1 and the step 2 is not particularly limited; the step 2 may be performed after performing the step 1, or the step 1 may be performed after performing the step 2, or the step 1 and the step 2 may be performed simultaneously in parallel.

In the present specification, "lengthwise" signifies that longitudinal dimension is sufficiently larger than width dimension. The longitudinal dimension is typically twice or more larger than the width dimension and preferably 3 times or more. The lengthwise optical laminate of the present invention may be in a roll shape; the rolling length thereof is preferably 300 m or more and more preferably from 1,000 m to 50,000 m.

In the present specification, "birefringence index in the thickness direction ($\Delta n_{xz}[\lambda]$)" is a value calculated from the expression: $\Delta n_{xz}[\lambda]=nx-nz$. The "nx" signifies a refractive index in the direction in which in-plane refractive index is maximum (namely, slow axis direction) and the "nz" signifies a refractive index in the thickness direction.

Figure 1:
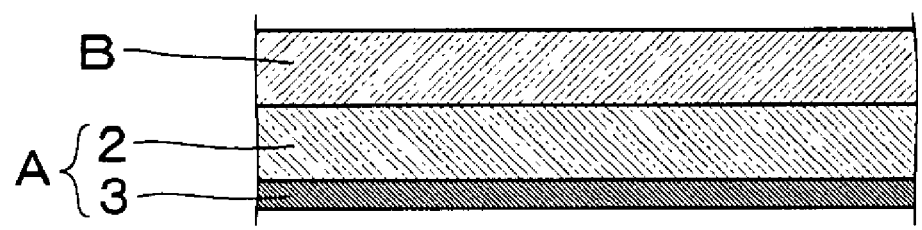
FIG. 1A and FIG. 1B are cross-sectional views showing one embodiment of a lengthwise optical laminate.
Figure 1B:
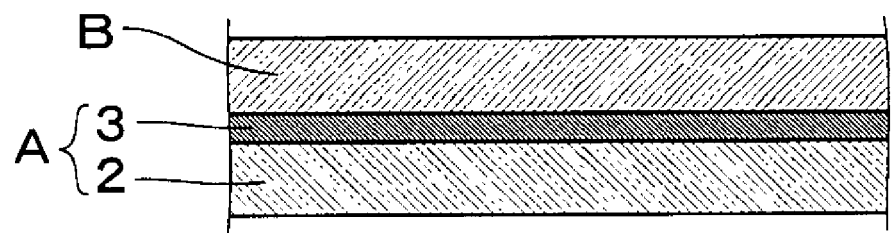

A lengthwise optical laminate (1) obtained by the producing method of the present invention, as shown in FIG. 1A and FIG. 1B, is a laminate having at least a lengthwise sheet (A) such that a lengthwise base material (2) and a birefringent film (3) are laminated, and a lengthwise polarizer (B) laminated on one plane of this sheet (A). In the laminate, as shown in FIG. 1A, the lengthwise base material (2) of the lengthwise sheet (A) may be laminated adjacently to the lengthwise polarizer (B), or as shown in FIG. 1B, the birefringent film (3) of the lengthwise sheet (A) may be laminated adjacently to the lengthwise polarizer (B).

[B. Step 1]

The step 1 of the producing method of the present invention is a step of coating and drying a coating solution comprising a birefringent material and a solvent on the surface of a lengthwise base material to form a birefringent film such that a birefringence index ($\Delta n_{xz}[590]$) in the thickness direction at a wavelength of 590 nm is 0.02 or more, and produce a lengthwise sheet (A) comprising the base material and the birefringent film. Since the producing method containing this step does not need to draw a birefringent film in the longitudinal direction, a wide birefringent film can be produced.

The lengthwise sheet (A) obtained by the step 1 comprises the following base material and the birefringent film. The total thickness of the lengthwise sheet (A) is preferably from 15 μm to 200 μm and more preferably from 15 μm to 90 μm.

The lengthwise sheet (A) is preferably transparent and colorless or little colored. The transmittance (TA) of the lengthwise sheet (A) at a wavelength of 590 nm is preferably 80% or more. The retardation value ($Rth_A[590]$) of the lengthwise sheet (A) in the thickness direction at a wavelength of 590 nm is preferably 20 nm or more and more preferably from 100 nm to 800 nm.

Here, in the present specification, the retardation value ($Rth[\lambda]$) in the thickness direction is a value calculated from the expression: $Rth=(nx-nz) \times d$. The "nx" signifies a refractive index in the direction in which in-plane refractive index is maximum (namely, slow axis direction), the "nz" signifies a refractive index in the thickness direction, and the "d" signifies a thickness (nm).

In the lengthwise base material used for the present invention, an optionally suitable base material is adopted. The lengthwise base material may be a monolayer or a laminate having two or more layers. The total thickness of the above lengthwise base material is preferably from 10 μm to 180 μm. The lengthwise base material is preferably a sheet which is molded out of a transparent and colorless or little colored resin.

The resin, which forms the sheet, is preferably a thermoplastic resin. The resin is more preferably ester based resins such as polyethylene terephthalate, polyethylene naphthalate, and the like; cellulose based resins such as diacetyl cellulose, triacetyl cellulose, and the like; norbornene based resins; acryl based resins such as polymethylene methacrylate and the like; styrene based resins such as polystyrene, acrylonitrile-styrene copolymer (AS resin), and the like; carbonate based resins.

The transmittance (T) of the lengthwise base material at a wavelength of 550 nm is preferably 80% or more.

The birefringence index ($\Delta n_{xz}[590]$) of the above lengthwise base material in the thickness direction at a wavelength of 590 nm is preferably 0.002 or less and more preferably 0.001 or less.

The absolute value of photoelastic coefficient of the above lengthwise base material at a wavelength of 590 nm is preferably $40 \times 10^{-12}$ m²/N or less and more preferably $20 \times 10^{-12}$ m²/N or less. The use of the lengthwise base material with low birefringence and low photoelastic coefficient allows a lengthwise sheet (A), in which optional unevenness is hardy generated, to be obtained even though the birefringent film is laminated thereon.

Here, in the present specification, the photoelastic coefficient signifies the liability to occurrence of birefringence when internal stress is caused by application of external force. The photoelastic coefficient may be determined, by measuring in-plane retardation value of the sheet with light having wavelength of 590 nm by using a spectroscopic ellipsometer "M-220" (product name) manufactured by JASCO Corporation, under application of stress at 23° C. on a sample piece of 2 cm×10 cm, and calculating from inclination of a function of retardation value and stress.

In a birefringent material used for the present invention, an optionally suitable birefringent material may be adopted as long as it is used for producing a birefringent film by a casting method, and the birefringence index of the film in the thickness direction at a wavelength of 590 nm ($\Delta n_{xz}[590]$) is 0.02 or more. Examples of the birefringent material include a liquid crystalline compound containing a bar-like liquid crystal compound or a discotic liquid crystal compound, and a thermoplastic resin having a stiff main chain skeleton.

The birefringent film may be a mono-layered structure having retardation or a multi-layered structure comprising multiple layers. The birefringent film preferably contains an imide based resin, an amide based resin, or an ester based resin. These resins have a rigid main chain skeleton, so that a thin birefringent film, in which an index ellipsoid thereof exhibits a relationship of nx=ny>nz, can be obtained by forming the coating solution into a film by casting method. As the imide based resin, for example, resins described in JP-A-8-511812 may be used. As the amide based resin, for example, resins described in JP-A-10-508048 may be used. As the ester based resin, for example, resins described in U.S. Pat. No. 6,964,795 may be used.

The imide based resin preferably has a hexafluoroisopropylidene group and/or trifluoromethyl group. It is more preferable that the imide based polymer has at least a repeat unit represented by the following general formula (I) or a repeat unit represented by the following general formula (II). The imide based polymer containing these repeat units are excellent in transparency and solubility in general solvents, and have a large birefringence index in the thickness direction.

The above imide based polymer may be obtained, for example, by reacting a tetracarboxylic acid dianhydride with a diamine. The repeat unit represented by the general formula (I) may be obtained, for example, by reacting 2,2'-bis(trifluoromethyl)-4,4'-diaminobiphenyl (this compound is the diamine) with a tetracarboxylic acid dianhydride having at least two aromatic rings. The repeat unit represented by the general formula (II) may be obtained, for example, by reacting 2,2-bis(3,4-dicarboxylphenyl)hexafluoropropanoic acid dianhydride (this compound is the tetracarboxylic acid dianhydride) with a diamine having at least two aromatic rings. This reaction may be a chemical imidization run in two stages or a thermal imidization run in one stage.

As the tetracarboxylic acid dianhydride, an optional and appropriate one is selected. Examples of the tetracarboxylic acid dianhydride include 2,2-bis(3,4-dicarboxyphenyl)hexafluoropropanoic acid dianhydride, 3,3',4,4'-benzophenonetetracarboxylic acid dianhydride, 2,3,3',4-benzophenonetetracarboxylic acid dianhydride, 2,2',3,3'-benzophenonetetracarboxylic acid dianhydride, 2,2'-dibromo-4,4',5,5'-biphenyltetracarboxylic acid dianhydride, 2,2'-bis(trifluoromethyl)-4,4',5,5'-biphenyltetracarboxylic acid dianhydride, 3,3',4,4'-biphenyltetracarboxylic acid dian-

[chemical formula 1]

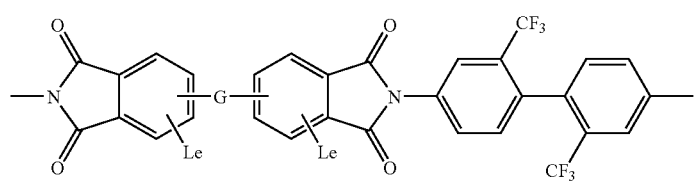

(I)

[chemical formula 2]

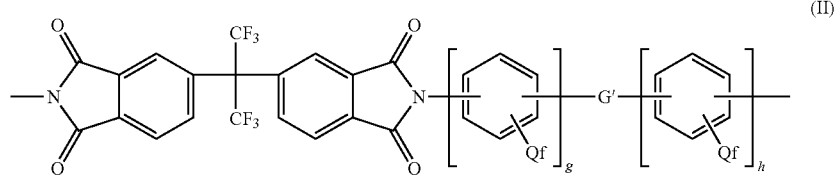

(II)

In the above general formulae (I) and (II), G and G' represent respectively independently a covalent bond or a group selected from the group consisting of $CH_2$ group, $C(CH_3)_2$ group, $C(CF_3)_2$ group, $C(CX_3)_2$ group (X is halogen), CO group, oxygen, sulfur, $SO_2$ group, $Si(CH_2CH_3)_2$ group, and $N(CH_3)$ group. The G and G' may be respectively the same or different.

In the above general formula (I), L represents a substituent group and the e represents a number of substitution thereof. The L is, for example, a halogen, alkyl group having from 1 to 3 carbons, phenyl group, or substituted phenyl group, and in the case where plural L are present, they are respectively the same or different. The number e is an integer from 0 to 3.

In the above general formula (II), Q represents a substituent group and the f represents a number of substitution thereof. The Q is, for example, an atom or a group selected from the group consisting of hydrogen, halogen, alkyl group, substituted alkyl group, nitro group, cyano group, thioalkyl group, alkoxy group, aryl group, substituted aryl group, alkylester group, and substituted alkylester group, and in the case where plural Q are present, they are respectively the same or different. The number f is an integer from 0 to 4 and the number g and h are an integer from 1 to 3, respectively.

hydride, 4,4'-bis(3,4-dicarboxyphenyl)ether dianhydride, 4,4'-oxydiphthalic acid dianhydride, 4,4'-bis(3,4-dicarboxyphenyl)sulfonic acid dianhydride, bis(2,3-dicarboxyphenyl)methanoic acid dianhydride, and bis(3,4-dicarboxyphenyl)diethylsilanoic acid dianhydride.

As the above diamine, an optional and appropriate one is selected. Examples of the above diamine include 2,2'-bis(trifluoromethyl)-4,4'-diaminobiphenyl, 4,4'-diaminobiphenyl, 4,4'-diaminophenylmethane, 4,4'-(9-fluorenylidene)-dianiline, 3,3'-dichloro-4,4'-diaminodiphenylmethane, 2,2'-dichloro-4,4'-diaminobiphenyl, 4,4'-diaminodiphenyl ether, 3,4'-diaminodiphenyl ether, 4,4'-diaminodiphenylsulfone, and 4,4'-diaminodiphenyl thioether.

A weight-average molecular weight (Mw) of the imide based polymer is preferably from 20,000 to 180,000. The weight-average molecular weight (Mw) may be found by using a dimethylformamide solution (1 L of a dimethylformamide solution by adding 10 mM of lithium bromide and 10 mM of phosphoric acid to adjust its volume) as a developing solution based on polyethylene oxide. An imidization ratio of the imide based polymer is preferably 95% or more. The imidization ratio can be found from an integral intensity ratio of a proton peak derived from polyamic acid that is polyimide precursor to a proton peak derived from polyimide.

The birefringent film formed by use of the above birefringent materials is preferably transparent and colorless or little colored. The $\Delta n_{xz}[590]$ of the birefringent film is 0.02 or more, preferably from 0.02 to 0.08, and more preferably from 0.03 to 0.07.

The Rth[590] of the birefringent film is 10 nm or more, preferably 100 nm or more, and more preferably from 100 nm to 800 nm. Such a material may offer a general birefringent film having Rth[590] capable of optically compensating a liquid crystal cell and having thin thickness.

The thickness ($d_c$) of the birefringent film is preferably from 0.1 μm to 10 μm and preferably from 0.5 μm to 5 μm. The ratio ($d_c/d_s$) between the thickness of the birefringent film ($d_c$) and the total thickness of the lengthwise base material ($d_s$) is preferably 0.2 or less and more preferably from 0.01 to 0.15. By decreasing the ratio of the birefringent film ($d_c$) with respect to the total thickness of the lengthwise base material ($d_s$) and adopting a material having a small absolute value of the photoelastic coefficient as a lengthwise base material, a lengthwise sheet (A), in which high retardation value is exhibited as a whole and optional unevenness is hard to be generated, can be obtained.

A solvent used for the present invention is mixed with the above birefringent material to constitute a coating solution. The solvent is used for uniformly expanding the coating solution onto a surface of the lengthwise base material. The coating solution may be a dispersion liquid such that the birefringent material is dispersed in the solvent, or a solution such that a part or all of the birefringent material is dissolved therein. With regard to the concentration of the coating solution, the birefringent material is preferably contained from 5 parts by mass to 50 parts by mass based on 100 parts by mass of the coating solution.

The coating solution may further contain an optionally suitable additive. Examples of the additive include a surfactant, a plasticizer, a heat stabilizer, a light stabilizer, a lubricant, an antioxidant, an ultraviolet absorbent, a flame retardant, a coloring agent, an antistatic agent, a compatibilizer, a crosslinking agent, a thickener, and the like. The additive amount thereof is preferably more than 0 and 10 parts by mass or less based on 100 parts by mass of the coating solution.

As the solvent, an optional and appropriate solvent may be selected. The solvent may be an inorganic solvent such as water. Also, the solvent may be an organic solvent such as alcohol, ketone, ether, ester, aliphatic hydrocarbon, aromatic hydrocarbon, halogenated carbon hydride, amide, cellosolve, and the like. The specific examples of the organic solvent include, for example, 2-butanol, isopropyl alcohol, glycerin, ethylene glycol, acetone, methyl ethyl ketone, methyl isobutyl ketone, cyclohexanone, diethyl ether, tetrahydrofuran, dioxane, anisole, acetic ether, butyl acetate, toluene, xylene, dichloromethane, dichloroethane, dimethylformamide, methylcellosolve, and the like. The solvent is used singly or in combination of two kinds or more.

As a method of coating the coating solution on the lengthwise base material, a coating method using a proper and appropriate coater is used. The coater is, for example, a slot dye coater, a reverse roll coater, a positive rotation roll coater, a gravure coater, a rod coater, a slot orifice coater, a curtain coater, or a fountain coater. A birefringent film having small unevenness in thickness can be obtained by adopting the coating method using the above coater.

The producing method for the lengthwise optical laminate of the present invention may further include the following step 4 after the above step 1. The step 4 is performed attendantly on the step 1 as required.

Step 4: a step of drawing the lengthwise sheet (A) obtained in the step 1 in the width direction so that an index ellipsoid of the birefringent film satisfies nx>ny≧nz.

The drawing of the lengthwise sheet (A) in the width direction allows retardation in the plane to be imparted to the lengthwise sheet (A). The use of a lengthwise optical laminate having the lengthwise base sheet (A) for a liquid crystal display allows contrast ratio of the liquid crystal display in the oblique direction to be further increased. Also, the drawing in the width direction widens the width of the lengthwise sheet (A), so that an optical laminate suitable for a large-sized liquid crystal display may be obtained.

In the case where the index ellipsoid of the birefringent film satisfies nx>ny≧nz, the lengthwise optical laminate of the present invention is preferably arranged so that the slow axis direction of the birefringent film is substantially orthogonal to the absorption axis direction of the lengthwise polarizer (B). Here, the "nx" of the birefringent film signifies a refractive index in the direction in which in-plane refractive index is maximum (namely, slow axis direction), the "ny" signifies a refractive index in the direction orthogonal to the slow axis in the plane (namely, fast axis direction), and the "nz" signifies a refractive index in the thickness direction. The "nx>ny≧nz" signifies nx>ny>nz or nx>ny=nz. This "ny=nz" includes a case in which ny and nz are substantially identical in addition to a case in which ny and nz are completely identical. The case in which ny and nz are substantially identical refers, for example, to a case in which Re[590]-Rth[590] is from −10 nm to 10 nm, preferably from −5 nm to 5 nm, and more preferably from −3 nm to 3 nm.

Here, in the present specification, the in-plane retardation value (Re[λ]) is a value calculated by the expression: Re= (nx−ny)×d at a wavelength of λ nm at 23° C.

Examples of the method for drawing the lengthwise sheet (A) include, for example, a horizontal uniaxial drawing method, a vertical and horizontal simultaneous biaxial drawing method, a vertical and horizontal sequential biaxial drawing method, or the like. The temperature (drawing temperature) for drawing the lengthwise sheet (A) is preferably from 120° C. to 200° C. The ratio (draw ratio) for drawing the lengthwise sheet (A) is preferably more than 1 and 3 times or less.

[C. Step 2]

The step 2 of the producing method of the present invention is a step of drawing a lengthwise film of a hydrophilic polymer containing a dichroic material so that a draw ratio is from 3 times to 5 times based on the original length and a neck-in ratio is 55% or less to produce a lengthwise polarizer (B).

A polarizer produced by the producing method including the step 2 may effectively prevent light leakage in the oblique direction in a black display as compared with a conventional polarizer. Thus, a liquid crystal display using the polarizer has high contrast ratio in the oblique direction. According to the assumption of the inventors, it is considered that the reason therefor is that the polarizer produced by the producing method has a dichroic material (iodine complex in the case of using iodine) oriented in the oblique direction, and the dichroic material absorbs light in the oblique direction. In the case of displaying a black image, a liquid crystal display using a conventional polarizer transmits light in the oblique direction to cause light leakage, so that true black color may not be displayed. In this point, the polarizer obtained by the producing method of the present invention may effectively prevent light leakage in the oblique direction and constitutes a liquid crystal display with high contrast ratio.

The producing method of the present invention allows a wide lengthwise polarizer (B) to be obtained. Thus, the width of the lengthwise optical laminate obtained by laminating this may be formed into preferably 1500 mm or more and more preferably 1700 mm or more.

Figure 2:
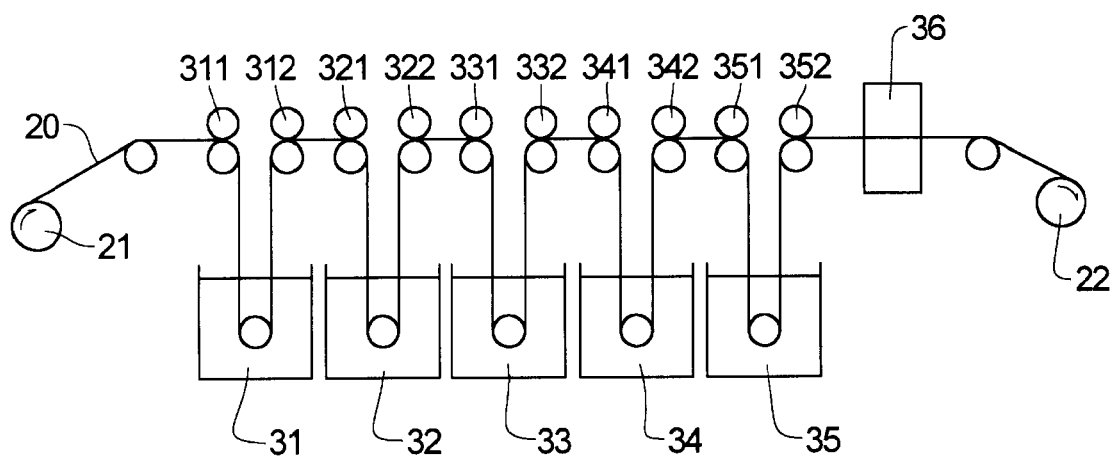
FIG. 2 is a reference drawing showing one example of producing steps for a lengthwise polarizer.

A specific example of the above step 2 is described by referring to FIG. 2. FIG. 2 is a schematic view showing a concept of a typical producing step for a lengthwise polarizer (B).

In FIG. 2, a lengthwise film 20 wound up into a roll is reeled out of a delivery portion 21. Next, the lengthwise film 20 is immersed in a swelling bath 31 containing pure water and a dyeing bath 32 containing such as iodine, and is subjected to swelling treatment and dyeing treatment while tension is applied in a longitudinal direction of the film by rolls 311, 312, 321 and 322 having different velocity ratios. Next, the lengthwise film 20 subjected to swelling treatment and dyeing treatment is immersed in a first crosslinking bath 33 and a second crosslinking bath 34 containing such as potassium iodide, and is subjected to crosslinking treatment and final drawing treatment while tension is applied in a longitudinal direction of the film by rolls 331, 332, 341 and 342 having different velocity ratios. The lengthwise film 20 subjected to crosslinking treatment is immersed in a washing bath 35 containing pure water by rolls 351 and 352, and is subjected to washing treatment. The film 20 subjected to washing treatment is dried by a drying means 36. The moisture percentage of the film 20 is adjusted, for example, from 10% to 30% by drying. Finally, the film 20 is wound up by a take-up portion 22.

(Lengthwise Film)

The lengthwise film may be a film obtained by forming a resin compound containing a hydrophilic polymer into a film. The film includes, for example, a polyvinyl alcohol (hereafter, polyvinyl alcohol denoted as PVA) based film, a partially formalated PVA based film, polyethylene terephthalate, an ethylene vinyl acetate copolymer based film, a partially saponified film of these, and the like. Furthermore, polyene based oriented films such as a dehydrated compound of PVA and a dehydrochlorinated compound of a polyvinyl chloride may be used. Among these, the film is preferably a PVA based film since the film has excellent dyeability of a dichroic material. The PVA is a polymer obtained by saponifying polyvinyl acetate obtained by polymerization of vinyl acetate. The PVA may be a PVA copolymerized with components copolymerizable with vinyl acetate such as unsaturated carboxylic acid, olefin, vinyl ether, unsaturated sulfonate, or the like. Also, the PVA based polymer includes a modified PVA which contains an acetoacetyl group, a sulfonic acid group, a carboxyl group, or the like and a modified PVA such as polyvinyl formal, polyvinyl acetal, or the like.

The thickness of the above lengthwise film is preferably from 30 μm to 100 μm.

In the case of using the PVA based polymer, the PVA based polymer may be obtained by saponifying a vinyl ester based polymer obtained by polymerizing vinyl ester based monomers such as vinyl acetate, for example. This PVA based polymer is preferably a PVA based polymer having a high saponification degree and a high polymerization degree from the viewpoint that the polymer is good in heat resistance and the like. A saponification degree of the PVA based polymer is not particularly limited, but for example, and is preferably from 90 mol % to 100 mol % and more preferably from 95.0 mol % to 99.9 mol %. The saponification degree can be calculated according to JIS K 6726-1994. An average polymerization degree of the PVA based polymer is not particularly limited, but for example, and is preferably from 1,000 to 8,000, more preferably from 1,200 to 3,600, and particularly preferably from 1,500 to 5,000. The average polymerization degree can be calculated according to JIS K 6726-1994.

The PVA based film may be obtained by a casting method of dissolving a resin compound containing a PVA based polymer into one or more appropriate organic solvents, such as water and/or DMSO, and forming the resin solution into a film form. The PVA based film may also be formed into a film by a known film-forming method such as an extruding method besides the casting method.

Further, the method for obtaining the above-mentioned PVA based film may be, for example, a method described in [Example 1] in JP-A-2001-315144.

A plasticizer or a surfactant may be blended with the resin compound containing the PVA based polymer. Also, the additive exemplified in the above section [B. step 1] may be blended in the resin compound containing the PVA based polymer. Examples of the plasticizer include polyalcohols such as ethylene glycol, glycerin, or the like. Examples of the surfactant include nonionic surfactant or the like. The addition of the plasticizer or the surfactant makes it possible to obtain a PVA based film excellent in dyeability and drawability. The additive amount of each of the plasticizer and the surfactant is more than about 1 part by mass and less than about 10 parts by mass for 100 parts by mass of the PVA based polymer, respectively.

As the PVA based film, a commercially available film may be used as it is. Examples of the commercially available PVA based film include "KURARAY VINYLON FILM (trade name)" manufactured by Kuraray Co., Ltd., "TOHCELLO VINYLON FILM (trade name)" manufactured by Tohcello Co., Ltd., "NICHIGOU VINYLON (trade name)" manufactured by Nippon Synthetic Chemical Industry Co., Ltd., or the like.

(Swelling Treatment)

The swelling treatment is a step of swelling a non-drawn hydrophilic polymer film. The production process using a PVA based film will be mainly described hereinafter. Here, the lengthwise polarizer (B) in the present invention is not limited to the production using a PVA based film, and may be applied also to other hydrophilic polymer films.

The swelling treatment is a step for removing stains on the surface of the PVA based film and further swelling the PVA based film with water to prevent introduction of unevenness of a dichroic material that will be described later.

The swelling bath is full with water. As far as the advantageous effects of the present invention are not damaged, any other material may be added to the solution in the swelling bath. A solution temperature of the swelling bath is preferably a temperature of about 20 to 50° C., more preferably a temperature of about 30 to 40° C. A period when the PVA based film is immersed in the swelling bath is from about 1 to 7 minutes. Water used in the swelling bath, a dyeing bath that will be described later, and other baths is preferably pure water.

(Dyeing Treatment)

The dyeing treatment is a step of impregnating (also referred to as absorbing or contacting) the swelled PVA based film with a dichroic material.

The dyeing bath is full with a dyeing solution containing water and a dichroic material dissolved in the water. Here, in the dyeing solution, an organic solvent compatible with water may be added a little.

The dichroic material used for the present invention includes iodine, dichroic dye, or the like. Examples of the above dichroic dye include such as red BR, red LR, red R, pink LB, rubin BL, bordeaux GS, sky blue LG, lemon yellow, blue BR, blue 2R, navy RY, green LG, violet LB, violet B, black H, black B, black GSP, yellow 3G, yellow R, orange LR, orange 3R, scarlet GL, scarlet KGL, congo red, brilliant violet BK, sublue G, sublue GL, suboorange GL, direct sky blue, direct first orange S, and first black. These dichroic materials may be used singly or in combination of two or more kinds. Further, the dichroic materials are preferably soluble in water. For this reason, an organic dye, in which a hydrophilic substituent such as a sulfonic group, an amino group, a hydroxyl group, or the like is introduced, is preferably used in a state of free acid and salt thereof such as an alkali metal salt, an ammonium salt, and a salt of amines, for example.

Among them, iodine is preferably used as the dichroic material. The use of iodine easily allows a polarizer exhibiting dichroic absorptivity to be obtained in approximately the whole range of visible light.

For obtaining the preferable lengthwise polarizer (B) in the above dyeing step, the additive amount of the dichroic material (for example, iodine) is preferably from 0.01 to 0.15 part by mass and more preferably from 0.01 to 0.05 part by mass for 100 parts by mass of water. The single transmittance of the lengthwise polarizer (B) can be increased or decreased properly by adjusting the additive amount of the dichroic material. For example, the single transmittance of the lengthwise polarizer (B) may be low by increasing the additive amount of the dichroic material. On the other hand, the single transmittance may be high by decreasing the additive amount of the dichroic material in the dyeing bath.

Further, an iodide may be added to the dyeing bath. Examples of the iodide include potassium iodine, lithium iodide, sodium iodide, zinc iodide, aluminum iodide, lead iodide, copper iodide, barium iodide, calcium iodide, tin iodide, titanium iodide, or the like. Among them, the iodide is preferably potassium iodide. The additive amount of the iodide is preferably from 0.05 to 0.5 part by mass and more preferably from 0.1 to 0.3 part by mass for 100 parts by mass of water. When the additive amount of the iodide is set in this range, a polarizer having a transmittance with a preferable range and a high polarization degree can be obtained.

A period when the PVA based film is immersed in the dyeing bath is not particularly limited, and is preferably from about 20 to 1,800 seconds. A solution temperature of the dyeing bath is preferably from about 20° C. to 60° C. and more preferably from about 30° C. to 50° C. If the temperature of the dyeing bath is too high, the film may be unfavorably melted. If the temperature is too low, the dyeability may fall. The dyeing step may be performed in two or more separated dyeing baths.

Also, the film may be drawn in this dyeing bath. At this time, the draw ratio is from about 1.5 to 3.0 times based on the original length.

(Crosslinking Treatment)

The crosslinking treatment is a step of impregnating the PVA based film, which is impregnated with the dichroic material, with a crosslinking agent such as boric acid. The crosslinking bath may be one bath or two or more bathes.

The dyeing bath is full with a dyeing solution containing water and a crosslinking agent dissolved in the water. As the crosslinking agent, for example, boron compounds such as boric acid, borax, or the like may be cited. These crosslinking agents may be used alone or in combination of two or more thereof. The crosslinking agent preferably contains at least boric acid.

The additive amount of the crosslinking agent in the crosslinking bath is not particularly limited, but preferably from 0.5 to 10 parts by mass and more preferably from 1 to 7 parts by mass for 100 parts by mass of water.

Further, an iodide (for example, potassium iodide) may be added to the crosslinking bath, and the additive amount of the iodide is preferably from 0.5 to 10 parts by mass and more preferably from 1 to 7 parts by mass for 100 parts by mass of water. By setting the additive amount of the iodine and iodide in this range, a polarizer having a transmittance with a preferable range and a high polarization degree may be obtained.

A solution temperature of the crosslinking solution is not particularly limited, and is preferably from 20° C. to 70° C. A period when the film is immersed therein is not particularly limited, and is preferably from about 60 to 1,200 seconds and more preferably from about 200 to 400 seconds.

The film may be drawn in the crosslinking bath. At this time, the draw ratio is from about 2 to 4 times based on the original length.

(Drawing Treatment)

The drawing treatment is a step of drawing the PVA based film uniaxially in the longitudinal direction.

The drawing treatment is preferably conducted in any one of the steps from the swelling treatment to the crosslinking treatment, or two or more steps selected from the swelling treatment to the washing treatment. Among periods from the dyeing treatment to the washing treatment, the drawing treatment is at least preferably conducted together with the dyeing treatment and the crosslinking treatment.

A step, which is intended to conduct drawing treatment mainly, may be set up between the swelling treatment and the crosslinking treatment. Alternatively, a step, which is intended to conduct drawing treatment mainly, may be set up after the crosslinking treatment.

In the drawing treatment, the non-drawn PVA based film (the PVA based film before introduced into the swelling treatment) is drawn from about 3 to 5 times longer than the original length thereof (in the case where the film is subjected to the drawing treatment in two or more steps, the draw ratio suggested herein is the total draw ratio obtained by summing up the draw ratios in the all steps), preferably from 4 to 5 times, and more preferably from 4.2 to 4.8 times. A polarizer obtained by drawing in this draw ratio may effectively prevent light leakage of the liquid crystal panel in the oblique direction.

The drawing is performed in the drawing treatment so that the neck-in ratio (NR) is 55% or less, preferably 50% or less, and more preferably from 35% to 50%.

In the present specification, the neck-in ratio (NR) is calculated by the following expression; $NR=(Wo-W)/Wo$ when the width of the non-drawn film and the width of the film after being drawn is regarded as Wo and W, respectively. The above neck-in ratio may be increased or decreased properly by adjusting draw ratio and/or distance between rolls in the case of adopting roll method drawing. For example, the decrease of draw ratio and/or distance between rolls decreases the neck-in ratio, while the increase of draw ratio and/or distance between rolls increases the neck-in ratio.

(Washing Treatment)

The washing treatment is a step of washing away unnecessary remnants such as boron adhering to the PVA based film that has undergone the above-mentioned individual steps.

The crosslinked PVA based film is pulled out from the crosslinking bath, and then introduced into a washing bath.

The washing bath is generally full with water. An appropriate additive may be optionally added to the solution in the washing bath.

A solution temperature of the washing bath is preferably from about 10° C. to 60° C. and more preferably from about 15° C. to 40° C. Also, a number of treatments for the washing is not particularly limited, and the washing treatment can be conducted in plural numbers.

(Drying Treatment)

The drying treatment is a step of drying the washed PVA based film.

The washed PVA based film is pulled out from the washing bath and dried.

As the drying method, appropriate methods such as natural drying, wind drying, drying by heating, or the like may be cited. In generally, the drying by heating is preferably used. In the drying by heating, for example, a temperature of heating is preferably from about 20 to 80° C., and a period of drying is preferably from about 1 to 10 minutes.

The lengthwise polarizer (B) obtained by the step 2 is obtained by drawing a lengthwise film containing a dichroic material. The lengthwise polarizer (B) preferably has at least the function of separating incident light into two orthogonal polarization components to transmit one polarization component and absorb the other polarization component. The total thickness of the lengthwise polarizer (B) is preferably from 10 μm to 50 μm and more preferably from 10 μm to 30 μm.

The single transmittance of the lengthwise polarizer (B) used for the present invention is preferably somewhat lower than the transmittance of a conventional polarizer (about 43%). The single transmittance (T) of the lengthwise polarizer (B) is preferably from 35% to 42% and more preferably from 39% to 41%. Here, the single transmittance (T) is the Y value obtained by making a visibility correction in accordance with the two-degree field (C light source) according to JIS Z 8701-1982.

The polarization degree (P) of the lengthwise polarizer (B) is preferably higher. Specifically, the polarization degree (P) is 98% or more, and preferably 99% or more.

It has been conventionally said that a polarizer is preferably high in both single transmittance and polarization degree. However, in the case of using a polarizer for a liquid crystal display (in particular, normally black system), the present inventors have found out that it is preferable to use a polarizer having single transmittance controlled to a specific range and high polarization degree in order to increase contrast ratio of the display in the oblique direction. Such a matter is a finding firstly found out by the present inventors and is an unexpected excellent effect.

Here, the single transmittance (T) and the polarization degree (P) of the lengthwise polarizer (B) may be measured by, for example, using a spectrophotometer [product name: "DOT-3", manufactured by Murakami Color Research Laboratory Co., Ltd.]. As the specific measuring method of the polarization degree, it can be obtained by measuring the parallel transmittance ($H_0$) and the orthogonal transmittance ($H_{90}$), and calculating the expression: polarization degree (%)=$\{(H_0-H_{90})/(H_0+H_{90})\}^{1/2} \times 100$. The parallel transmittance ($H_0$) is a value of a transmittance of a parallel laminated polarizer formed by putting two identical polarizers onto each other so as to make their absorption axes parallel to each other. The orthogonal transmittance ($H_{90}$) is a value of a transmittance of an orthogonally laminated polarizer formed by putting two identical polarizers onto each other so as to make their absorption axes orthogonal to each other. These transmittances are each a Y value obtained by making a visibility correction in accordance with the two-degree field (C light source) according to JIS Z 8701-1982.

The dichroic ratio (DR) of the lengthwise polarizer (B) is preferably from 40 to 100, more preferably from 45 to 95, and particularly preferably from 50 to 70. When a polarizer exhibiting the dichroic ratio in this range is used for a liquid crystal display, the contrast ratio in the oblique direction can be increased markedly. Here, in the present specification, "dichroic ratio (DR)" can be calculated by the expression: DR=A($\perp$)/A($\parallel$). The A($\perp$) is an absorbance of an orthogonally laminated polarizer formed by putting two identical polarizers onto each other so as to make their absorption axes orthogonal to each other, and the A($\parallel$) is an absorbance of a parallel laminated polarizer formed by putting two identical polarizers onto each other so as to make their absorption axes parallel to each other.

The above dichroic ratio may be adjusted to a desired range by draw ratio and transmittance of a polarizer. For example, in the producing processes of the lengthwise polarizer (B), higher draw ratio allows a polarizer higher in dichroic ratio to be obtained. On the other hand, lower draw ratio allows a polarizer lower in dichroic ratio to be obtained. Also, in the producing processes of the lengthwise polarizer (B), higher transmittance of a polarizer by lowering the concentration of a dichroic material (such as iodine concentration) in a dyeing bath allows a polarizer higher in dichroic ratio to be obtained. On the other hand, lower transmittance of a polarizer by increasing the concentration of a dichroic material allows a polarizer lower in dichroic ratio to be obtained. The dichroic ratio may also be adjusted by controlling both draw ratio and the concentration of a dichroic material.

The in-plane birefringence index ($\Delta n_{xy}[1000]$) of the lengthwise polarizer (B) at a wavelength of 1000 nm is preferably from 0.015 to 0.030 and more preferably from 0.015 to 0.025. By using the lengthwise polarizer (B) exhibiting the $\Delta n_{xy}[1000]$) in this range for a liquid crystal display, the contrast ratio in the oblique direction of this display may be increased markedly. Here, in the present specification, "in-plane birefringence index ($\Delta n_{xy}[\lambda]$)" is a value calculated from the expression: $\Delta n_{xy}=nx-ny$. The "nx" signifies a refractive index in the direction in which in-plane refractive index is maximum (namely, slow axis direction) and the "ny" signifies a refractive index in the direction orthogonal to the slow direction in the plane (namely, fast axis direction).

The in-plane retardation value of the lengthwise polarizer (B) at a wavelength of 1000 nm is preferably from 400 nm to 850 nm and more preferably from 500 nm to 800 nm. Here, the in-plane retardation value of the lengthwise polarizer (B) is calculated from the product of in-plane birefringence index ($\Delta n_{xy}1000$]) of this polarizer and the thickness (nm) of this polarizer. The use of the lengthwise polarizer (B) exhibiting an in-plane retardation value in the above range for a liquid crystal display allows contrast ratio of this display in the oblique direction to be remarkably increased.

In the case where the lengthwise polarizer (B) is dyed with iodine, the content of the iodine in the lengthwise polarizer (B) is preferably from 2.7 to 6.0% by mass, more preferably from 2.9 to 5.5% by mass, and particularly preferably from 3.2 to 5.0% by mass. A lengthwise polarizer (B) having a transmittance and a polarization degree with a preferable range can be obtained by setting the content of iodine in this range.

Further, the lengthwise polarizer (B) preferably contains kalium. In this case, the content of kalium in the lengthwise polarizer (B) is preferably from 0.2 to 1.2% by mass and more preferably from 0.3 to 1.2% by mass. A lengthwise polarizer (B) having a transmittance and a polarization degree with a preferable range can be obtained by setting the content of kalium in this range.

Also, the lengthwise polarizer (B) preferably contains boron. In this case, the content of boron in the lengthwise polarizer (B) is preferably from 0.5 to 3.0% by mass and more preferably from 1.0 to 2.8% by mass. A lengthwise polarizer (B) having a transmittance and a polarization degree with a preferable range can be obtained by setting the content of boron in this range.

[D. Step 3]

The step 3 is a step in which the lengthwise polarizer (B) obtained in the above step 2 is laminated on one surface of the lengthwise sheet (A) obtained in the above step 1 to produce a lengthwise optical laminate.

In one embodiment, the lengthwise sheet (A) is laminated in the step 3 so that the base material side thereof is adjacent to the lengthwise polarizer (B). Thus, the lengthwise optical laminate obtained as above is provided with lengthwise polarizer (B)/lengthwise base material (2)/birefringent film (3) in this order, as shown in FIG. 1A. According to such an embodiment, the above base material serves for a protective layer of the polarizer, so that an optical laminate excellent in heat resistance and mechanical strength may be obtained.

In another embodiment, the lengthwise sheet (A) is laminated in the step 3 so that the birefringent film side thereof is adjacent to the polarizer. Thus, the lengthwise optical laminate obtained as above is provided with lengthwise polarizer (B)/birefringent film (3)/lengthwise base material (2) in this order, as shown in FIG. 1B. According to such an embodiment, the above birefringent film is held between the lengthwise polarizer (B) and the lengthwise base material (2), so that a lengthwise optical laminate with small change of retardation may be obtained.

The lengthwise polarizer (B) and the lengthwise sheet (A) are preferably adhered through an adhesive layer. In the present specification, "adhesive layer" signifies a layer that bonds both surfaces of neighboring members to integrate these members with each other by practically sufficient adhesive force in a practically adequate adhering time. As examples of materials forming the adhesive layer, an adhesive agent, a pressure sensitive adhesive agent and an anchor coating agent are cited. The above adhesive layer may have a multilayer structure in which an anchor coating agent is formed on the surface of a body to be coated and an adhesive layer or a pressure sensitive adhesive layer is formed on the anchor coating agent. The adhesive layer may be a thin layer as is not discernible with the naked eye (also referred to as a hairline).

(E. Another Step)

The producing method of the present invention may further include the following step 5 after the above step 3. The step 5 is performed incidentally as need.

Step 5: a step of cutting out the lengthwise optical laminate obtained in the step 3 into a rectangular shape of 70 inches or more to produce an optical laminate in the shape of rectangle (refers to a rectangular optical laminate).

The rectangular optical laminate signifies a laminate, which is produced by cutting out (punching out) the lengthwise optical laminate into a rectangular shape.

Specifically, the lengthwise optical laminate is formed into a shape corresponding to a display size (typically, rectangular shape) through the step 5. A Thomson blade is typically used for this cutting processing. The length of a diagonal line of the rectangular optical laminate is preferably 70 inches or more, more preferably 80 inches or more, and particularly preferably 100 inches or more.

The above rectangular optical laminate is preferably manufactured so that the longitudinal side direction thereof is substantially parallel or orthogonal to the absorption axis direction of the polarizer of the rectangular optical laminate. Particularly preferably, the longitudinal side direction of the above rectangular optical laminate is substantially orthogonal to the absorption axis direction of the polarizer of the rectangular optical laminate. Such a rectangular optical laminated film is preferably disposed on the backlight side of a liquid crystal cell. Here, in the present specification, "substantially parallel" includes a case where an angle formed by the longitudinal side direction and the absorption axis direction is 0°±2° and preferably 0°±1°. In the present specification, "substantially orthogonal" includes a case where an angle formed by the longitudinal side direction and the absorption axis direction is 90°±2° and preferably 90°±1°.

[F. Application of Optical Laminate]

The lengthwise optical laminate obtained by the producing method of the present invention is formed into arbitrary shapes and used for appropriate applications. The rectangular optical laminate, which is obtained by forming the lengthwise optical laminate into rectangular shape, may be preferably used for a component member of a liquid crystal panel. The liquid crystal panel having the rectangular optical laminate of the present invention may be mounted on a liquid crystal display as a component member.

The application of the liquid crystal display is, for example, office automation equipments such as a personal computer monitor, a notebook computer and a copying machine; portable equipments such as a portable telephone, a watch, a digital camera, a personal digital assistant (PDA) and a portable game machine; domestic electrical equipments such as a video camera, a television set and a microwave oven; on-vehicle equipments such as a back monitor, a monitor for a car navigation system and a car audio; display equipments such as an information monitor for a commercial store; security equipments such as an observation monitor; and care/medical equipments such as a care monitor and a medical monitor.

The preferable application of the liquid crystal display having the rectangular optical laminate of the present invention is a television set. The screen size (a length of diagonal line of the rectangular screen) of the television set is preferably 70 inches or more, more preferably 80 inches or more, and particularly preferably 100 inches or more.

EXAMPLES

Hereinafter, the present invention will be further described by way of Examples and Comparative Example. Here, the present invention is not limited only to the following Examples. Individual analyzing methods used in Examples and Comparative Example are as follows.

(1) Method for Measuring Single Transmittance of Polarizer:

A spectrophotometer [product name: "DOT-3", manufactured by Murakami Color Research Laboratory Co., Ltd.] was used to measure the single transmittance. The single transmittance is the Y value of tristimulus values based on the two-degree field according to JIS Z 8701-1995.

(2) Method for Measuring Polarization Degree of Polarizer:

A spectrophotometer [product name: "DOT-3", manufactured by Murakami Color Research Laboratory Co., Ltd.] was used to measure the parallel transmittance ($H_0$) and the orthogonal transmittance ($H_{90}$) of the polarizer, and the polarization degree was calculated from the following expression: polarization degree (%)=$\{(H_0-H_{90})/(H_0+H_{90})\}^{1/2} \times 100$. The parallel transmittance ($H_0$) is a value of a transmittance of a parallel laminated polarizer formed by putting two identical polarizers onto each other so as to make their absorption axes parallel to each other. The orthogonal transmittance ($H_{90}$) is a value of a transmittance of an orthogonally laminated polarizer formed by putting two identical polarizers onto each other so as to make their absorption axes orthogonal to each other. The transmittance is the Y value of tristimulus values based on the two-degree field according to JIS Z 8701-1995.

(3) Method for Measuring Dichroic Ratio (DR) of Polarizer:

A spectrophotometer [product name: "DOT-3", manufactured by Murakami Color Research Laboratory Co., Ltd.] was used to measure the $T_{ave}$ and the P of a polarizer. The dichroic ratio was calculated from the following expression: $DR=A(\perp)/A(\|)=\log\{(T_{ave}/100)\times(1=P/100)\}/\log\{(T_{ave}/100)\times(1+P/100)\}$.

Here, the $T_{ave}$ is an average value of the single transmittances of the two polarizers used in the measurement, and the P is the above-mentioned polarization degree.

(4) Method for Measuring Content of Each of Elements (I and K):

A circular sample having a diameter of 10 mm was measured by fluorescent X-ray analysis under conditions described below. From the resultant of X-ray intensity, the content of each of the elements was calculated on the basis of a calibration curve prepared in advance by use of a standard sample.

Analysis device: fluorescent X-ray analyzer (XRF) Product name: "ZSX 100e", manufactured by Rigaku Corporation.

Counter cathode: rhodium

Dispersive crystal: lithium fluoride

Exciting light energy: 40 kV-90 mA

Iodine measuring ray: I-LA

Potassium measuring ray: K-KA

Quantity measuring method: FP method $2\theta$ angle peak: 103.078 degrees (iodine), 136.847 degrees (potassium)

Measuring period: 40 seconds (5) Method for Measuring Retardation Value ($\Delta n_{xy}[\lambda]$ and $Re[\lambda]$) of Polarizer and the Like:

A near-infrared retardation measuring product (trade name: "KOBRA-31×100/IR") manufactured by Oji Scientific Instruments used to measure the values at a wavelength of 1000 nm at 23° C.

(6) Method for Measuring Retardation Value ($Re[\lambda]$ and $Rth[\lambda]$) of Birefringent Film and Lengthwise Sheet:

A product (trade name: "KOBRA 21-ADH") manufactured by Oji Scientific Instruments was used to measure the values at a wavelength of 590 nm at 23° C. Here, the average refractive index was a value measured with an Abbe refractometer [trade name: "DR-M4", manufactured by Atago Co., Ltd.].

(7) Method for Measuring Thickness:

When the thickness was less than 10 μm, a spectrophotometer for thin films [product name: "SHUNKAN [transliteration] MULTI PHOTOMETRY SYSTEM MCPD-2000", manufactured by Otsuka Electronics Co., Ltd.] was used to measure the thickness. When the thickness was 10 μm or more, a digital micrometer "KC-351C model" manufactured by Anritsu Corporation was used to measure the thickness.

(8) Method for Measuring Molecular Weight of Polyimide Based Resin:

The molecular weight was calculated out by gel permeation chromatography (GPC) method using polyethylene oxide as a standard sample. An apparatus, tools, and conditions for the measurement are as follows:

Sample: a sample was dissolved in an eluent to prepare a 0.1% by mass solution thereof.

Pretreatment: the sample was allowed to stand still for 8 hours, and then filtrated through a 0.45 μm membrane filter.

Analyzer: "HLC-8020GPC", manufactured by Tosoh Corporation

Columns: GMHXL+GMHXL+G2500HXL, manufactured by Tosoh Corporation

Column size: each of the columns=7.8 mm $\phi$×30 cm (total: 90 cm)

Eluent dimethylformamide (a solution obtained by adding 10 mM of lithium bromide and 10 mM of phosphoric acid, and then adding dimethylformamide to the resultant up to a total volume of 1 litter)

Flow rate: 0.8 mL/min.

Detector: RI (differential refractometer)

Column temperature: 40° C.

Injected amount: 100 μL (9) Method for Measuring Contrast Ratio in Liquid Crystal Display:

After 30 minutes passed from a time when its backlight was turned on in a dark room at 23° C., a product (product name: "EZ Contrast 160D") manufactured by Eldim Company was used to measure the Y values in the XYZ display system at an azimuth angle from 0° to 360° and a polar angle of 60° in a display screen when a white image and a black image were displayed. From the Y value (YW) of the white image and the Y value (YB) of the black image, the ratio between the contrast (i.e., the contrast ratio) "YW/YB" in the oblique direction was calculated out. Here, the longitudinal sides of the liquid crystal panel was set to an azimuth angle of 0°, and the normal direction thereof was set to a polar angle of 0°.

Synthesis Example 1

Into a reaction container (500 mL) equipped with a mechanical stirrer, a Dean-Stark apparatus, a nitrogen-introducing tube, a thermometer, and a condenser tube were added 17.77 g (40 mmol) of 2,2'-bis(3,4-dicarboxyphenyl) hexafluoropropionic acid dianhydride [manufactured by Clariant (Japan) K. K.] and 12.81 g (40 mmol) of 2,2-bis (trifluoromethyl)-4,4'-diaminobiphenyl [manufactured by Wakayama Seika Kogyo Co., Ltd.]. Subsequently, thereto was added a solution wherein 2.58 g (20 mmol) of isoquinoline was dissolved in 275.21 g of m-cresol, and the resultant was stirred (at 600 rpm) at 23° C. for 1 hour, so as to obtain a homogeneous solution. Next, an oil bath was used to heat the reaction container to set the temperature of the inside of the reaction container to 180±3° C. While the temperature was kept, the solution was stirred for 5 hours to obtain a yellow solution. The solution was further stirred for 3 hours, and then the heating and the stirring were stopped. The resultant was naturally cooled to return the temperature to room temperature. As a result, a polymer in a gel form was precipitated.

Acetone was added to the yellow solution in the reaction container to dissolve the gel completely. In this way, a diluted solution (7% by mass) was produced. This diluted solution was added little by little to 2 L of isopropyl alcohol while the alcohol was stirred. In this way, white powder was precipitated. This powder was collected by filtration, and put into 1.5 L of isopropyl alcohol so as to be washed. Furthermore, the same operation was repeated once more to wash the powder. Thereafter, the powder was again collected by filtration. This was dried in an air-circulating thermostatic oven 60° C. in temperature for 48 hours. Thereafter, the powder was dried at 150° C. for 7 hours to obtain powder of a polyimide of a structural formula (III) illustrated below with a yield content of 85%. A weight-average molecular weight (Mw) of the polyimide was 124,000, and an imidization rate was 99.9%.

[chemical formula 3]

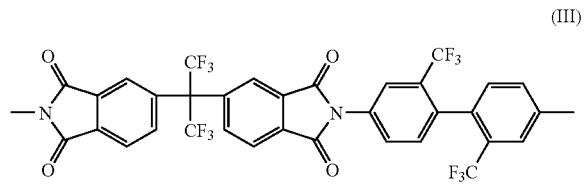

(III)

EXAMPLE

Producing Example of Lengthwise Sheet

The polyimide powder described in the above chemical structure formula (III) was dissolved into methyl isobutyl ketone to prepare a 15% by mass solution of the polyimide. This polyimide solution was cast into a sheet form uniformly onto a surface of a triacetylcellulose film (thickness: 80 μm) with a slot die coater. Next, the film was put into an air-circulating drying oven having plural chambers. The solvent was then vaporized while the temperature was gradually raised from a low temperature as follows: the temperature was kept at 80° C. for 2 minutes, at 135° C. for 5 minutes, and at 150° C. for 10 minutes. Next, the film was drawn 1.15 times at 147° C. by a fixed-end lateral uniaxial drawing method using a tenter drawing machine.

As described above, a lengthwise sheet (a1), in which a polyimide film (refers to as a birefringent film (a1)) having a thickness of 33 μm was laminated on a lengthwise triacetyl-cellulose film (also refers to lengthwise base material (a1)), was obtained. The birefringent film (a1) had an index ellipsoid exhibiting a relationship of nx>ny>nz and $\Delta n_{xz}[590]=0.056$. The lengthwise sheet (a1) had a single transmittance $T[590]=90\%$, $Re[590]=55$ nm, $Rth[590]=245$ nm.

(Production Example of Lengthwise Polarizer)

A lengthwise film (trade name: "VF-PS #7500", manufactured by Kuraray Co., Ltd.), 75 μm in thickness, made mainly of a polyvinyl alcohol based resin was immersed into five baths under conditions described below while a tension was applied to the film along the longitudinal direction of the film. In this way, the film was drawn to set such that the final drawn length was 4.5 times longer than the original length of the film and a neck-in ratio was 50%. This drawn film was dried in an air-circulating drying oven of 60° C. temperature for one minutes. In such a way, a lengthwise polarizer (b1), 40 μm in thickness, was produced. The lengthwise polarizer (b1) had properties shown in Table 1.

<Conditions>

(1) Swelling bath: pure water 30° C. in temperature (2) Dyeing bath: aqueous solution, 30° C. in temperature, containing 0.038 part by mass of iodine and 0.2 part by mass of potassium iodide for 100 parts by mass of water.

(3) First crosslinking bath: aqueous solution, 40° C. in temperature, containing 3 parts by mass of potassium iodide and 3 parts by mass of boric acid for 100 parts by mass of water.

(4) Second crosslinking bath: aqueous solution, 60° C. in temperature, containing 5 parts by mass of potassium iodide and 4 parts by mass of boric acid for 100 parts by mass of water.

(5) Water washing bath: aqueous solution, 25° C. in temperature, containing 3 parts by mass of potassium iodide for 100 parts by mass of water.

TABLE 1

| | Lengthwise polarizer (b1) | Lengthwise polarizer (b2) |
|---|---|---|
| Final draw ratio | 4.5 | 6.0 |
| Neck-in ratio (%) | 50 | 65 |
| Thickness (μm) | 40 | 25 |
| Width (mm) | 1700 | 1300 |
| Single transmittance (%) | 39.2 | 42.9 |
| Parallel transmittance (%) | 30.5 | 36.5 |
| Orthogonal transmittance (%) | 0.0020 | 0.0030 |
| Poralization Dgree (%) | 99.99 | 99.99 |
| Iodine content (% by mass) | 4.6 | 2.6 |
| Potassium content (% by mass) | 1.1 | 0.6 |
| dichroic ratio | 62.2 | 133.6 |
| $\Delta n_{xy}[1000]$ | 0.019 | 0.036 |
| in-plane retardation value (nm) | 756 | 900 |

(Lamination Example of Lengthwise Sheet and Lengthwise Polarizer)

The lengthwise sheet (a1) was laminated on one side of the lengthwise polarizer (b1) through a water-soluble adhesive having polyvinyl alcohol based resin (trade name: "GOHSEFIMER Z200", manufactured by Nippon Synthetic Chemical Industry Co., Ltd.) as the main component so that the birefringent film (a1) side is opposite to the lengthwise polarizer (b1) and the slow axis direction of the birefringent film (a1) is substantially orthogonal to the absorption axis direction of the lengthwise polarizer (b1). A triacetyl cellulose film with a thickness of 80 μm was laminated on the other side of the lengthwise polarizer (b1) through the same water-soluble adhesive to produce a lengthwise optical laminate (x1) with a width of 1700 mm. This lengthwise optical laminate (x1) was cut out by a Thomson blade into a rectangular shape with a screen size of 40 inches to obtain a rectangular optical laminate (x1). This optical laminate is also generally called a polarizing plate.

Here, in the example, a liquid crystal panel of 40 inches was used for evaluation of display properties, and the optical laminate obtained by the producing method of the present invention may also be applied to a large-sized liquid crystal panel of 70 inches or more.

(Production Example 1 of Another Polarizing Plate)

A lengthwise triacetyl cellulose film with a thickness of 80 μm was laminated on both sides of the lengthwise polarizer (b1) through the same water-soluble adhesive to produce a lengthwise polarizing plate (x2) with a width of 1700 mm. This lengthwise polarizing plate (x2) was cut out by a Thomson blade into a rectangular shape of 40 inches to obtain a rectangular polarizing plate (x2).

(Preparation of Liquid Crystal Cell)

A liquid crystal panel was taken out from commercially available liquid crystal display [40 inches liquid crystal television manufactured by Sony Corporation; trade name: "BRAVIA KDL-40X1000"], having a liquid crystal cell in a VA mode, and then all optical films, such as polarizing plates, arranged on front-back both sides of the liquid crystal cell were removed. The front and back surfaces of glass plates of this liquid crystal cell were washed. In such a way, the liquid crystal cell was obtained.

(Production Example 1 of Liquid Crystal Display)

Figure 3:
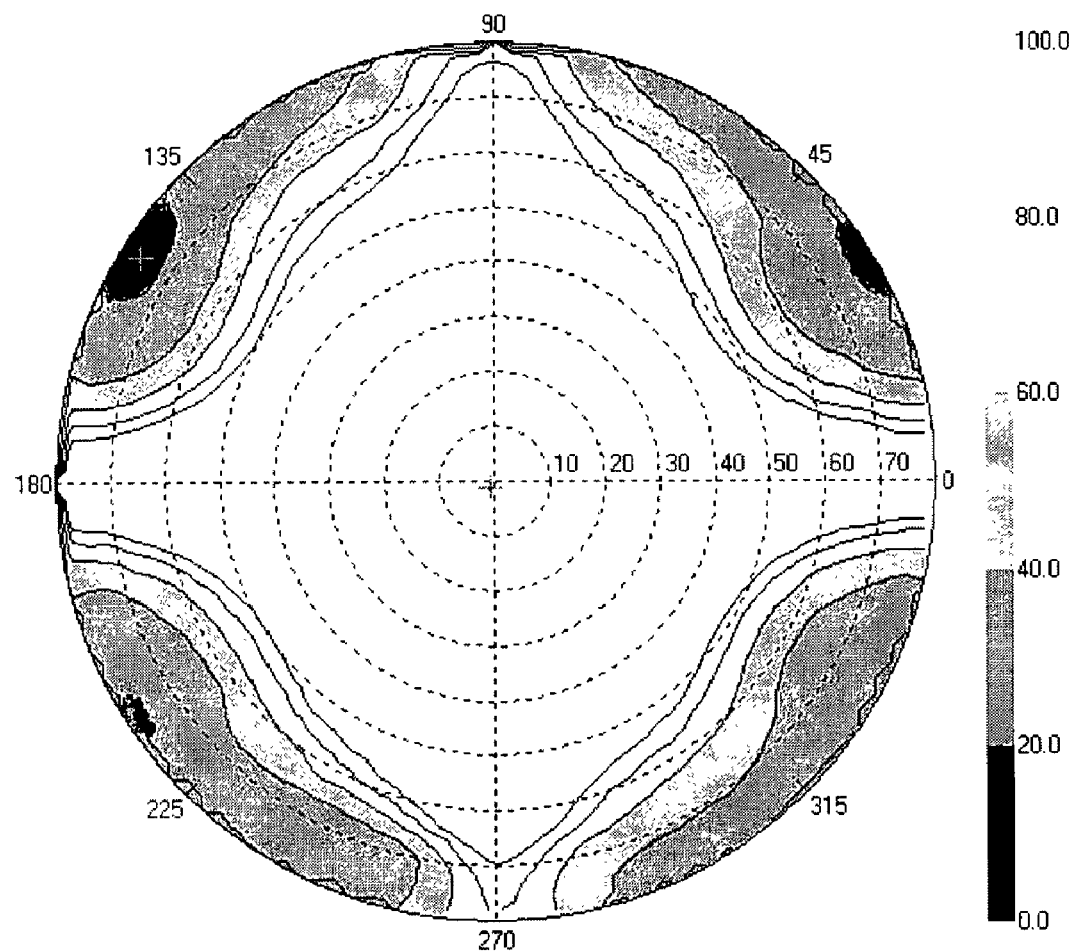
FIG. 3 is a contrast contour map of a liquid crystal panel of Example.
Figure 5:
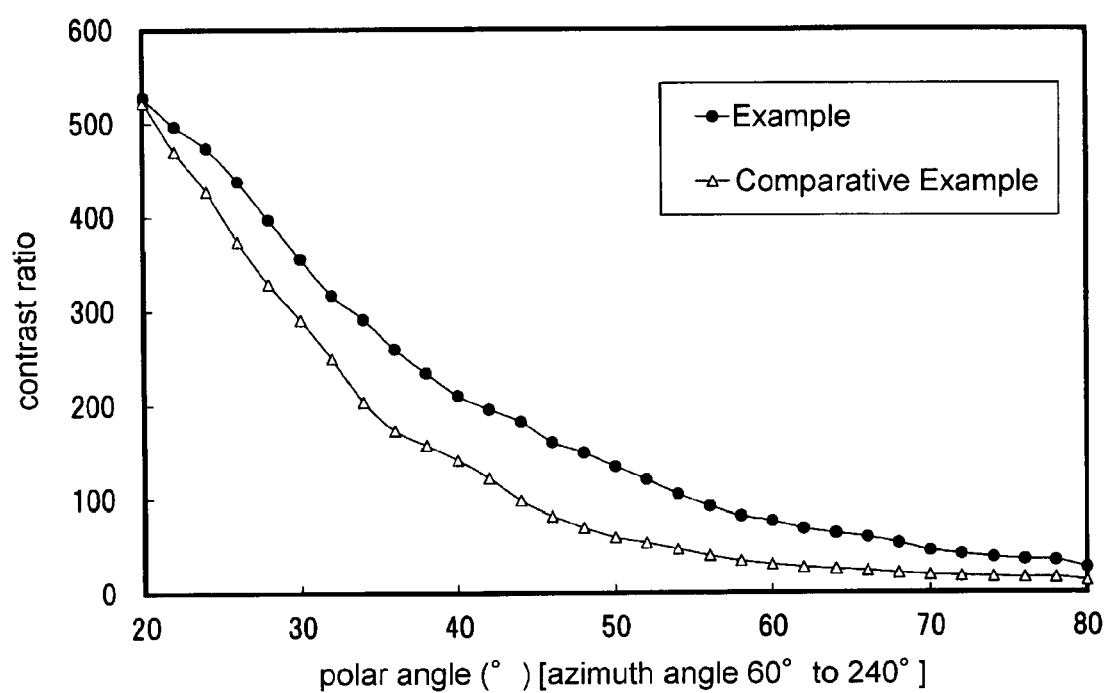
FIG. 5 is a graph view showing polar angle dependence of contrast ratio at an azimuth angle of 60° to 240° in liquid crystal displays of Example and Comparative Example.

The rectangular optical laminate (x1) was adhered onto the viewing side of the liquid crystal cell prepared as described above through an acrylic based pressure sensitive adhesive (20 μm in thickness). The adhesion of the laminate was performed so that the absorption axis direction of the polarizer was substantially orthogonal to the longitudinal side direction of the liquid crystal cell and the birefringent film side was located in the liquid crystal cell side. Next, the rectangular polarizing plate (x2) was adhered onto the backlight side of the liquid crystal cell through an acrylic based pressure sensitive adhesive (20 μm in thickness). The adhesion of the plate was performed so that the absorption axis direction of the polarizer was substantially orthogonal to the longitudinal side direction of the liquid crystal cell. As the liquid crystal panel obtained as described above, the absorption axis direction of the polarizer of the rectangular optical laminate (x1) was substantially orthogonal to the absorption axis direction of the polarizer of the rectangular polarizing plate (x2). Also, the slow axis direction of the birefringence film (a1) was substantially orthogonal to the absorption axis direction of the lengthwise polarizer (b1). The liquid crystal panel thus obtained was combined with a backlight unit of the original liquid crystal display, which was taken out as described above, so as to produce a liquid crystal display according to Example. Display characteristics of the resultant liquid crystal display are shown in FIGS. 3 and 5.

Comparative Example

A lengthwise polarizer (b2) according to Comparative Example was produced in the same manner as in the production example of the lengthwise polarizer of Example except that the amount of iodine added in a dyeing bath was 0.025 part by mass based on 100 parts by mass of water and the drawing was performed so that the final draw ratio was 6.0 times based on the original length and the neck-in ratio was 65% of the film. This lengthwise polarizer (b2) was 1300 mm in width.

The same lengthwise sheet (a1) as in Example and a lengthwise triacetyl cellulose film with a thickness of 80 μm were laminated on one side and the other side of this lengthwise polarizer (b2), respectively, through the same water-soluble adhesive to produce a lengthwise optical laminate (y1) with a width of 1300 mm. This lengthwise optical laminate (y1) was cut out by a Thomson blade into a rectangular shape with a screen size of 40 inches to obtain a rectangular optical laminate (y1). The properties of the lengthwise polarizer (b2) according to Comparative Example are shown in Table 1.

Production Example 2 of Another Polarizing Plate

A lengthwise triacetyl cellulose film with a thickness of 80 μm was laminated on both sides of the above lengthwise polarizer (b2) through the same water-soluble adhesive to produce a lengthwise polarizing plate (y2). This lengthwise polarizing plate (y2) was cut out by a Thomson blade into a rectangular shape of 40 inches to obtain a rectangular polarizing plate (y2).

Production Example 2 of Liquid Crystal Display

Figure 4:
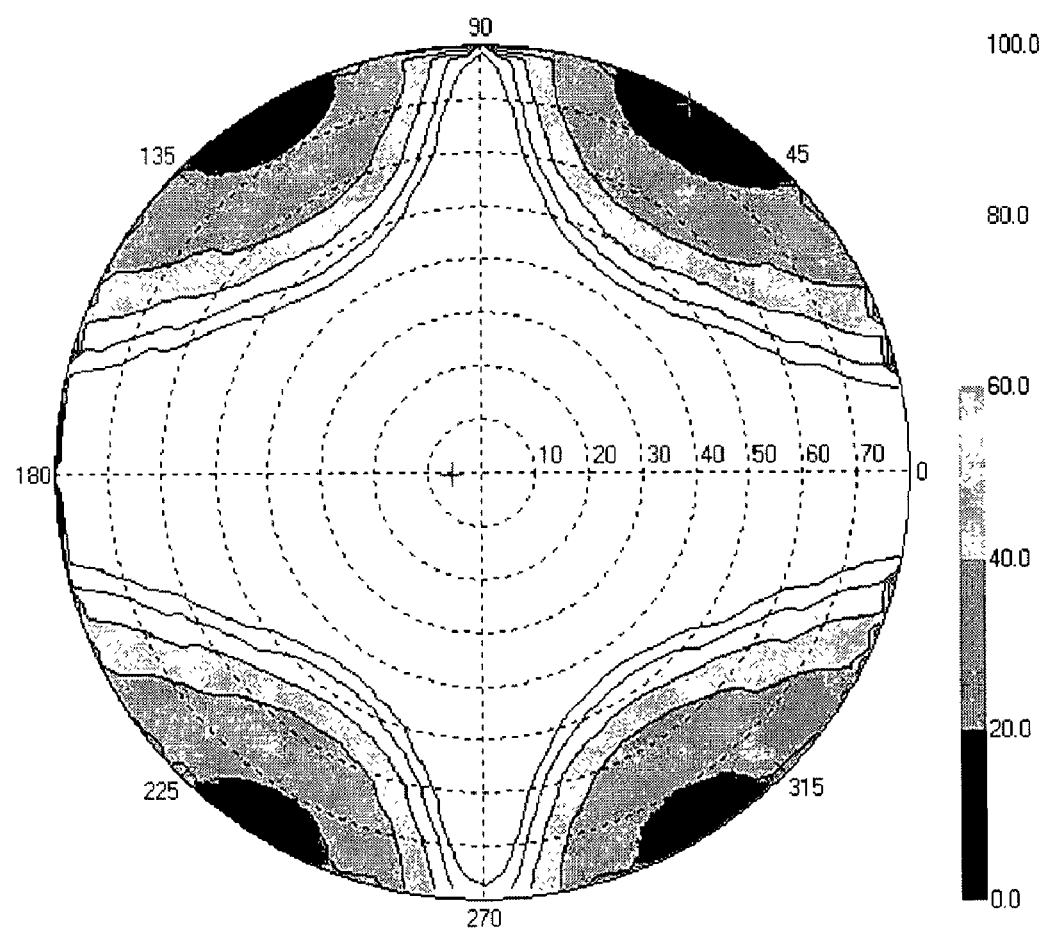
FIG. 4 is a contrast contour map of a liquid crystal panel of Comparative Example.

A liquid crystal panel and a liquid crystal display were produced by the same method as in Example except for replacing the rectangular optical laminate (x1) and the rectangular polarizing plate (x2) with the rectangular optical laminate (y1) and the rectangular polarizing plate (y2), respectively. The display characteristics of the liquid crystal display of Comparative Example are shown in FIGS. 4 and 5.
[Evaluations]
As clarified from Example and Comparative Example, the lengthwise optical laminate (x1) of Example is 1500 mm or more in width and may be applied to a large-sized liquid crystal display. In addition, a liquid crystal display into which the rectangular optical laminate (x1) of Example was incorporated offered remarkably high contrast ratio in the oblique direction as compared with the liquid crystal display of Comparative Example, as clarified from FIGS. 3 to 5.

What is claimed is:

1. A producing method for a lengthwise optical laminate comprising the following steps 1 to 3:
    step 1: a step of coating and drying a coating solution comprising a birefringent material and a solvent on a surface of a lengthwise base material to form a birefringent film such that a birefringence index ($\Delta n_{xz}[590]$) in the thickness direction at a wavelength of 590 nm is 0.02 or more, and produce a lengthwise sheet (A) comprising the base material and the birefringent film;
    step 2: a step of stretching a lengthwise film of a hydrophilic polymer containing a dichroic material so that a stretched rate is from 3 times to 5 times based on the original length and a shrinking rate is 55% or less to produce a lengthwise polarizer (B); and
    step 3: a step of laminating the lengthwise sheet (A) obtained in the step 1 on one plane of the lengthwise polarizer (B) obtained in the step 2 to produce the lengthwise optical laminate,
    wherein the birefringence index ($\Delta n_{xz}[590]$) is a value calculated from the expression: ($\Delta n_{xz}[590]$)=nx−nz, the nx signifies a refractive index in the direction of the birefringent film in which in plane refractive index is maximum (slow axis direction) and the nz signifies a refractive index in the thickness direction of the birefringent film.

2. The producing method for the lengthwise optical laminate according to claim 1, wherein a width of the lengthwise optical laminate is formed into 1500 mm or more.

3. The producing method for the lengthwise optical laminate according to claim 1, wherein in the step 3, a base material side of the lengthwise sheet (A) is laminated so as to be adjacent to the lengthwise polarizer (B).

4. The producing method for the lengthwise optical laminate according to claim 1, wherein in the step 3, a birefringent film side of the lengthwise sheet (A) is laminated so as to be adjacent to the lengthwise polarizer (B).

5. The producing method for the lengthwise optical laminate according to claim 1, further comprising the following step 4 after the step 1:
    step 4: a step of stretching the lengthwise sheet (A) obtained in the step 1 in the width direction so that an index ellipsoid of the birefringent film satisfies nx>ny≧nz,
    wherein the ny signifies a refractive index in the direction orthogonal to the slow axis in the plane of the birefringent film (fast axis direction).

6. The producing method for the lengthwise optical laminate according to claim 1, wherein a dichroic ratio (DR) of the lengthwise polarizer (B) is from 40 to 100.

7. The producing method for the lengthwise optical laminate according to claim 1, wherein the lengthwise polarizer (B) has a polarization degree (P) of 99% or more and a transmittance (T) of 35% to 42%.

8. The producing method for the lengthwise optical laminate according to claim 1, wherein in the step 3, the lengthwise sheet (A) is laminated on one side of the lengthwise polarizer (B) through an adhesive layer.

9. The producing method for the lengthwise optical laminate according to claim 1, further comprising the following step 5 after the step 3:

step 5: a step of cutting out the lengthwise optical laminate obtained in the step 3 into a rectangular shape having a diagonal line of 70 inches or more to produce a rectangular optical laminate.

10. A liquid crystal panel comprising the optical laminate obtained by the producing method according to claim 1.

* * * * *